US007596592B2

(12) United States Patent
Mason et al.

(10) Patent No.: US 7,596,592 B2
(45) Date of Patent: Sep. 29, 2009

(54) METHOD AND A SYSTEM OF REMOTELY CONTROLLING DATA TRANSFER VIA A DATA TRANSFER NETWORK

(75) Inventors: Terrence I Mason, Ipswich (GB); Stephen Minnis, Wreningham (GB)

(73) Assignee: British Telecommunications plc, London (GB)

( * ) Notice: Subject to any disclaimer, the term of this patent is extended or adjusted under 35 U.S.C. 154(b) by 869 days.

(21) Appl. No.: 10/469,350

(22) PCT Filed: Mar. 14, 2002

(86) PCT No.: PCT/GB02/01177

§ 371 (c)(1),
(2), (4) Date: Aug. 28, 2003

(87) PCT Pub. No.: WO02/080492

PCT Pub. Date: Oct. 10, 2002

(65) Prior Publication Data

US 2004/0093375 A1     May 13, 2004

(30) Foreign Application Priority Data

Mar. 28, 2001    (GB)  ............................... 0107760.1

(51) Int. Cl.
     *G06F 15/16*      (2006.01)
(52) U.S. Cl. .................................. 709/203; 709/217
(58) Field of Classification Search ................ 709/203, 709/217–219, 232, 238, 245–246, 226
See application file for complete search history.

(56) References Cited

U.S. PATENT DOCUMENTS

| 5,546,444 | A | * | 8/1996 | Roach et al. ............. 455/412.2 |
| 5,717,737 | A | * | 2/1998 | Doviak et al. ............... 455/403 |
| 5,732,074 | A | * | 3/1998 | Spaur et al. ................. 370/313 |
| 5,749,053 | A | * | 5/1998 | Kusaki et al. ............... 455/524 |
| 5,845,282 | A | | 12/1998 | Alley et al. |
| 5,852,721 | A | | 12/1998 | Dillon et al. |
| 6,047,313 | A | * | 4/2000 | Hashimoto et al. .......... 709/203 |
| 6,125,275 | A | * | 9/2000 | Comer et al. ............ 455/426.1 |

(Continued)

FOREIGN PATENT DOCUMENTS

| EP | 0838774 A2 | 4/1998 |
| WO | WO 99/66746 | 12/1999 |

OTHER PUBLICATIONS

Counterpart Canadian Application 2,439,561: Office Action dated Jan. 6, 2005.

(Continued)

*Primary Examiner*—Yasin M Barqadle
(74) *Attorney, Agent, or Firm*—Nixon & Vanderhye PC

(57) ABSTRACT

Remote data transfer is achieved via a data transfer network. To allow a user to transfer data at a higher data transfer rate in a cellular network, a user experiences the problem that the bandwidth available to him may vary, and in particular, may not be sufficient to allow the user to download information from the internet. To address this problem, a registered user is allowed to transfer identified data, for example, data identified by a particular url, by a user of a cellular network to a remote location, for example, the user's home computer.

15 Claims, 2 Drawing Sheets

U.S. PATENT DOCUMENTS

| | | | |
|---|---|---|---|
| 6,263,210 B1 * | 7/2001 | Takahashi | 455/464 |
| 7,016,978 B2 * | 3/2006 | Malik et al. | 709/246 |
| 7,136,632 B1 * | 11/2006 | Blants et al. | 455/418 |
| 7,155,517 B1 * | 12/2006 | Koponen et al. | 709/227 |
| 2002/0059449 A1 * | 5/2002 | Wandel et al. | 709/238 |
| 2002/0091855 A1 * | 7/2002 | Yemini et al. | 709/238 |
| 2002/0129107 A1 * | 9/2002 | Loughran et al. | 709/206 |

OTHER PUBLICATIONS

Counterpart EPO Application 02 704 982.4: Office Action dated Apr. 19, 2006.

Counterpart EPO Application 02 704 982.4—2413: Decision dated Nov. 21, 2008.

Canadian Office Action dated Mar. 25, 2009, re CA 2,439,561.

* cited by examiner

METHOD AND A SYSTEM OF REMOTELY CONTROLLING DATA TRANSFER VIA A DATA TRANSFER NETWORK

This application is the US national phase of international application PCT/GB02/101177 filed 14 Mar. 2002 which designated the U.S.

BACKGROUND

1. Technical Field

This invention relates to remotely controlling data transfer via a data transfer network, in particular a cellular network or cellular mobile communications system.

2. Related Art

With the development of present mobile networks and the introduction of new mobile networks, it is possible to access data, for example, from the internet from mobile handsets, eg. using wireless application protocol (WAP) phones. However, the varying distance between a handset and one or more antennas is such that the bandwidth available to users via their handsets cannot be guaranteed to consistently support high bandwidth downloads of data. This can result in the failure of a download, data may be lost, or the download may be interrupted. This situation could have a negative impact on the user perception of the network quality.

BRIEF SUMMARY

The present invention provides a solution to this problem. The inventors of the present invention have devised a system which allows a mobile handset user to transfer data he wishes to download to a remote location, i.e. a location other than that at which user and handset are located, where the consistency of bandwidth availability is not an issue. For example, the present invention allows a handset user to transfer data using his mobile handset to a personal computer to which he has access and which is connected to the internet. Once downloaded to the remote location, the user may then access the data as and when required.

According to a first aspect of the invention, there is provided a method of remote data transfer via a data transfer network comprising the steps of:
storing at a first data processing facility routing data associated with a first terminal for data transfer to a second remote terminal,
from said first terminal communicating via said first data processing facility data with said network,
via said network identifying at said second data processing facility data to be transferred to said second remote terminal,
instructing said second data processing facility via said first data processing facility to transfer said data, said first data processing facility accessing said stored routing data associated with said first terminal and instructing said second data processing facility to transfer said data to be transferred to said second remote terminal using said routing data.

According to a second aspect of the invention, there is provided a system for enabling remote data transfer via a data transfer network, said system comprising: a data transfer network including a first data processing facility and a second data processing facility for storing data to be transferred,
a first terminal connected to said first data processing facility and to said second data processing facility via said network,
a second remote terminal connected to said network, said first data processing facility including means for storing routing data associated with said first terminal for data transfer to said second remote terminal, said first data processing facility being adapted to use said routing data when instructed by said first terminal to transfer data from said second data processing facility to said remote terminal.

The invention enables a network operator to better manage customers expectations of bandwidth availability and perception of quality of service.

BRIEF DESCRIPTION OF THE DRAWINGS

An embodiment of the invention will now be described with reference to the drawings, in which.

BRIEF DESCRIPTION OF EXEMPLARY EMBODIMENTS

The embodiment to be described in detail is a service which allows a user to identify data on a mobile handset which he wishes to download and then download that data at a second terminal, for example at the user's home terminal.

Figure 1:
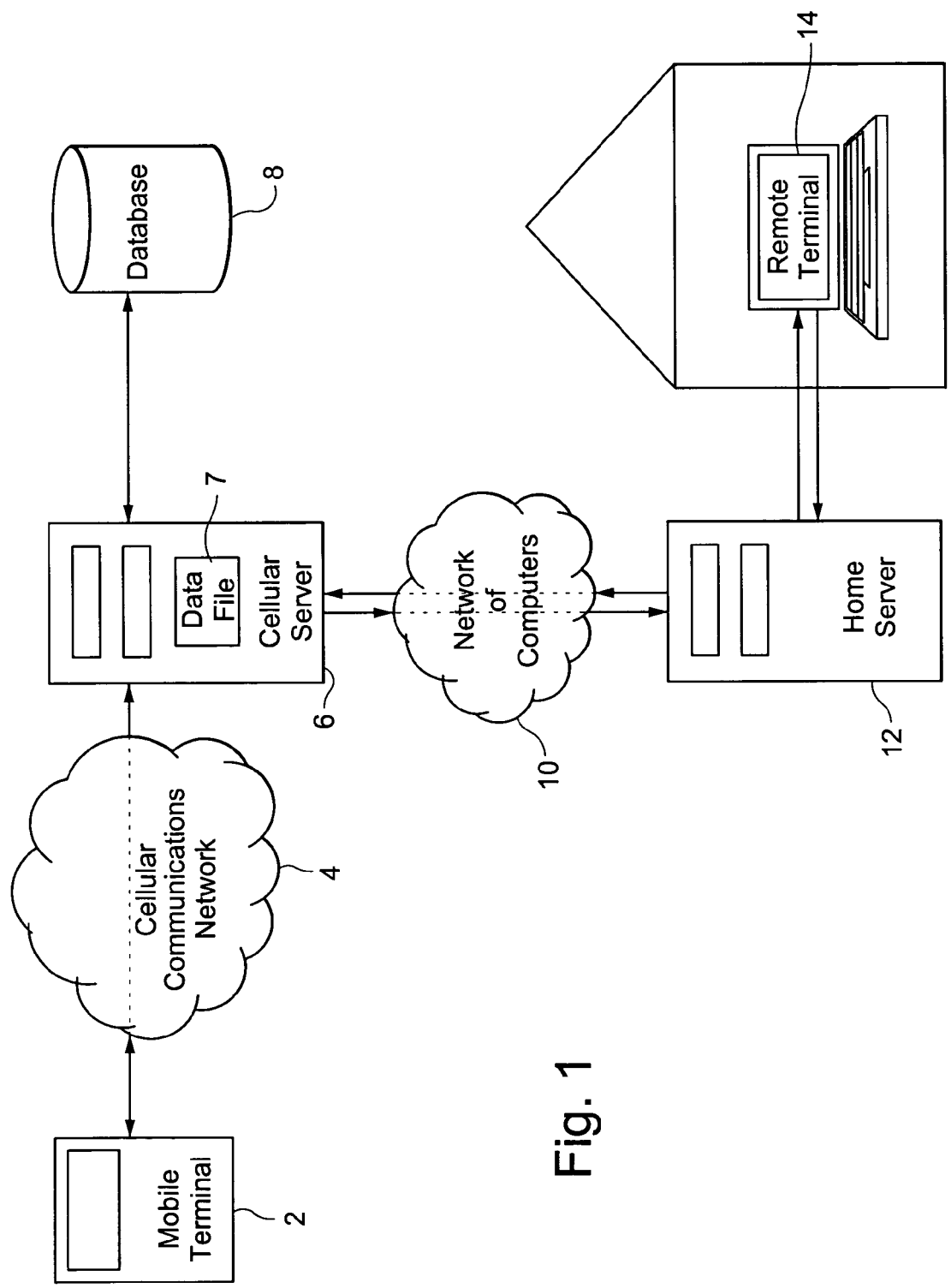
FIG. 1 illustrates the general arrangement of the units participating in the service.

The embodiment illustrated in FIG. 1 allows a user who is registered with the service with a standard mobile terminal 2, for example a mobile phone, a personal digital assistant (PDA), a laptop computer, or any communications apparatus with access to a cellular communications network 4, to identify a data file 7, for example an image or sound file (such as standard format files currently known as Joint Photographic Experts Group (JPEG), Motion Picture Experts Group (MPEG), MP3 etc.) located at a uniform resource locator (URL) address, using the mobile terminal and downloading that data to a second terminal, for example using file transfer protocol (FTP).

The user's mobile terminal 2 is in communication with a cellular server 6 via a cellular communications network 4 through which it may access a network of computers 10, typically various local area networks (LANs) connected to an information exchange network such as the internet 10 or a local exchange network such as an intranet. Communications and data exchange is managed by cellular server 4 using a database 8 which stores user service registration data. A user will normally have registered as a user of this data transfer service by indicating the particular remote terminal 14 linked to the internet 10 and to which data is to be transferred. The database then stores data identifying the user, the user's cellular handset 2 and associated therewith routing data or address data which identifies the second terminal 14. This database is preferably a lightweight directory access protocol (LDAP) database, which is structured specifically to facilitate looking up addresses. Such routing data or address data in particular data identifies a home server 12 via which the second terminal 14 is in communication with the internet. Such an address may be dynamically allocated by the home server when the user logs on via a home computer (as second remote terminal), as is the case for private users. Alternatively, it may be a dedicated URL address.

To enable remote data transfer a user must first have subscribed to the present service with the provider, e.g. the cellular network provider. The provider will secure managed access to the user's home PC using software which is either downloaded to the user's home server from a download facility, or may be accessed via a generic lookup server. The provider also enters the routing data into the LDAP database.

When subscribing, the user may customize his settings, by specifying the extension mappings for different types of file downloads. Thus a movie or video file download and audio file downloads will require different MIME type extensions (.avi or .mov and .mp3 respectively).

An example of a download facility or generic lookup service is provided by JINI™ Java based network technology developed by Sun Microsystems, in which different devices (servers) offering different services connect together to form a community network on which all these services are freely available to outside users. This technology uses a lookup service with which devices and services register. An outside user uses the lookup service to locate services and download the relevant software.

A mobile user data transfer session is now detailed

Via the user's mobile handset, which may be a third generation (UMTS) or a WAP enabled handset, a user logs on to the remote data transfer service by submitting user specific data, such as username and password, to the cellular server, which may be a WAP proxy server. The cellular server then authenticates the user specific data against data stored in the LDAP database to ensure that the user subscribes to the present service, and accesses the remote terminal routing data associated with the submitted user specific data.

At this stage the user may also submit extensions for a desired session transfer format. For example, video and audio files may be found in a variety of formats depending on how the data has been digitised. Each format has a different "extension" associated with it, such as MP3, WAV or AU for audio files or "avi" or ".mov" for video files. In order for each of these files to be played at the remote location, the terminal at the remote location must be configured to process each format. The user has the option at this stage to submit the extensions, i.e. the format, in which he wishes data to be downloaded.

Once connected to the service the user then engages in a normal (WAP or UMTS) session, for example accessing various addresses on the internet.

Upon locating a desired file, for example a video file, the user selects the file on the cellular handset. This file will be associated with a URL address, to which the user is normally connected directly for data transfer (i.e. in non remote data transfer mode). The remote data transfer enabled cellular server translates the associated URL address to activate the relevant software at the home server. This is done, for example, by incorporating the associated URL as argument in a new URL address which points to download facility or lookup server selected at the home server. In this example, a video file with URL address "http://www.vid.com/movie.avi"

becomes

"http://openworld.jini/proxy.java?url=http://www.vid.com/movie.avi&linktext=v ideo"

which activates the home server to access the relevant software to download the file of the desired format to the desired address. The portion of the rewritten url which reads "http://www.vid.com/movie.avi&linktext=video" is referred to as the arguments, and represents the data for download to the remote location.

Figure 2:
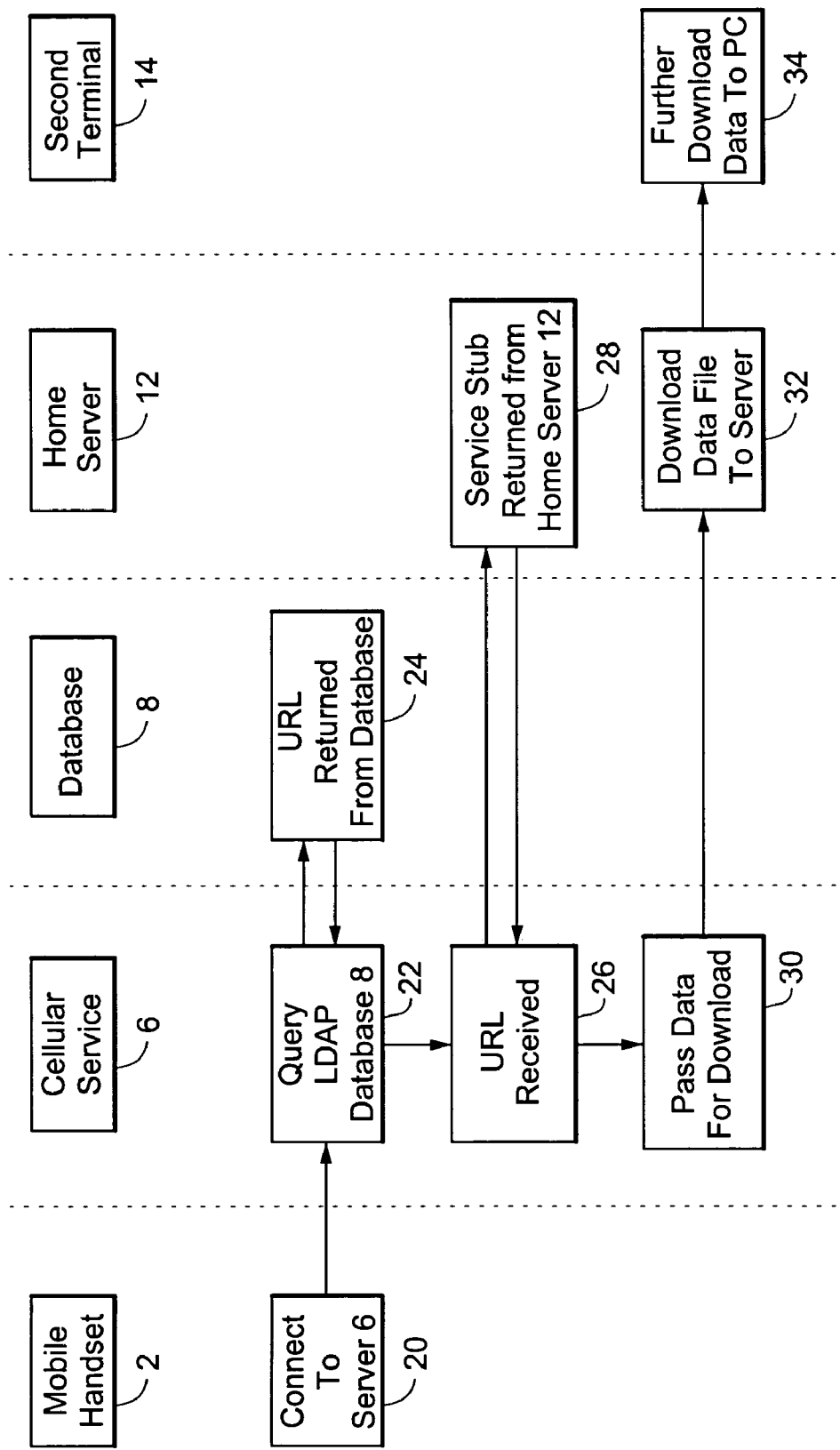
FIG. 2 is a flow diagram illustrating the steps carried out by the units participating in the service.

The data exchange between the various units involved in the above embodiment may be realized as schematically shown in the flow diagram of FIG. 2. In step 20 the user via mobile handset 2 connects to the cellular server 6 to access a communications network such as the internet. At step 22 the cellular server 6 then queries the LDAP database 8 to look up the server 12 URL associated with a second terminal 14 to which the user has access. The server 12 may, for example, be the server associated with the user's home computer, i.e. the user's home server 12. The second terminal 14 is preferably one having a high bandwidth access. However, it is not limited in this respect and may also be a second cellular handset. At step 24, the LDAP database 8 returns the URL address associated with the second terminal 14 to the cellular server 6. This URL address received by the cellular server 6 in step 26 then enables the cellular server 6 to connect to the designated home server 12 to request a "service stub". A "service stub" is information indicating how communication is to be conducted with the server 12. Devices in a network using Jini technology are linked together using Remote Method Invocation (RMI), which is a Java program. The RMI uses a "service stub" and "skeleton". Both of these are software programs. The "service stub" is a small piece of code which tells the cellular server how to communicate with the skeleton, which is situated at the second server. At step 28, the "service stub" is returned from the home server 12 to the cellular server 6. Once the "service stub" has been received at the cellular server 6, it is able to communicate with the second server 14. Receipt of the stub causes the cellular server 6 at step 30 to pass the arguments, i.e the data for download at the remote location, to the user's Jini service at the user's home server 12. At step 32, the user's Jini service at the home server 12 downloads the file, for example, the video file as local thread process on the user's home PC 14, as shown in step 34. Once the arguments have been forwarded to the user's home server 12, the data for download may either be downloaded immediately to the user's PC 14. Alternatively, the data may be downloaded later, when the user next logs on to his home PC 14.

What is claimed is:

1. A method of remotely controlling data transfer via a data transfer network in a communications system comprising a first mobile terminal arranged to access said data transfer network via a first data processing facility and a second remote terminal arranged to access said data transfer network via a second data processing facility, wherein at said first data processing facility routing data associated with said first mobile terminal is stored to enable data transfer to said second remote terminal via said data transfer network, the method comprising:

said first mobile terminal, under user control, identifying an address of data to be remotely transferred;

said first mobile terminal communicating said address via said first data processing facility to said second data processing facility to enable said data to be transferred to said second remote terminal;

said first data processing facility instructing said second data processing facility to transfer said data; and said first data processing facility accessing said stored routing data associated with said first mobile terminal and instructing said second data processing facility to transfer said data to be transferred to said second remote terminal using said routing data.

2. A method according to claim 1 wherein in said instructing step said first data processing facility instructs said second data processing facility to transfer said data to be transferred by combining said address data and said routing data.

3. A method according to claim 1, in which said data transfer network is a cellular network.

4. A method according to claim 1 in which said first data processing facility is a cellular server.

5. A method according to claim 1 in which said second data processing facility is a server.

6. A method according to claim 1 wherein said first mobile terminal is a cellular handset.

7. A communications system for enabling a user to remotely control data transfer, the system comprising:
- a data transfer network for remotely controlling data transfer;
- a first data processing facility;
- a second data processing facility;
- a first mobile terminal arranged, under user control, to access said data transfer network via said first data processing facility;
- a second remote terminal arranged to access said data transfer network via a second data processing facility;
- wherein said first mobile terminal, under user control, is configured:
  - to identify an address of data to be remotely transferred, and
  - to communicate address data via said first data processing facility to said second data processing facility to enable said data to be transferred to said second remote terminal; and
- wherein said first data processing facility is configured:
  - to store routing data associated with said first mobile terminal to enable data transfer to said second remote terminal via said data transfer network,
  - to access said stored routing data associated with said first mobile terminal, and
  - to instruct said second data processing facility to transfer said data to said second remote terminal using said routing data.

8. A system according to claim 7 wherein said second data processing facility is adapted to store data to be transferred in association with said address data accessible via said network and wherein said first data processing facility further includes means for combining said routing data and said address data when said first mobile terminal accesses said address data and instructs said first data processing facility to transfer said data to be transferred from said second data processing facility to said second remote terminal.

9. A system according to claim 7 in which said data transfer network is a cellular network.

10. A system according to claim 7 in which said routing data is the address of a second data processing facility associated with said second remote terminal.

11. A system according to claim 7 in which said first data processing facility is a cellular server.

12. A system according to claim 7 in which said second data processing facility is a server.

13. A system according to claim 7 wherein said first mobile terminal is a cellular handset.

14. A mobile terminal configured for use in a system as claimed in claim 7 as a first terminal or a second terminal.

15. A data transfer network configured for use in a system as claimed in claim 7.

* * * * *